United States Patent

Ikeda et al.

(10) Patent No.: US 10,746,294 B2
(45) Date of Patent: Aug. 18, 2020

(54) CONTROL DEVICE FOR CONTINUOUSLY VARIABLE TRANSMISSION (71) Applicants: JATCO LTD, Fuij-shi, Shizuoka (JP); Nissan Motor Co., Ltd., Yokohama-shi, Kanagawa (JP)

(72) Inventors: Naoyasu Ikeda, Atsugi (JP); Geunseok Ryu, Atsugi (JP)

(73) Assignees: JATCO LTD., Fuji-shi (JP); NISSAN MOTOR CO., LTD., Yokohama-shi (JP)

(*) Notice: Subject to any disclaimer, the term of this patent is extended or adjusted under 35 U.S.C. 154(b) by 0 days.

(21) Appl. No.: 16/320,533

(22) PCT Filed: Jul. 27, 2017

(86) PCT No.: PCT/JP2017/027275
§ 371 (c)(1),
(2) Date: Jan. 25, 2019

(87) PCT Pub. No.: WO2018/025748
PCT Pub. Date: Feb. 8, 2018

(65) Prior Publication Data
US 2019/0249774 A1 Aug. 15, 2019

(30) Foreign Application Priority Data

Aug. 3, 2016 (JP) ................. 2016-153062

(51) Int. Cl.
*F16H 61/662* (2006.01)
*F16H 61/02* (2006.01)
(Continued)

(52) U.S. Cl.
CPC ........... *F16H 61/662* (2013.01); *F16H 59/40* (2013.01); *F16H 61/02* (2013.01); *F16H 59/50* (2013.01);
(Continued)

(58) Field of Classification Search
CPC ........ F16H 61/662; F16H 61/02; F16H 59/40; F16H 59/50; F16H 59/70;
(Continued)

(56) References Cited

U.S. PATENT DOCUMENTS

2016/0258531 A1* 9/2016 Ito .............................. F16H 9/18
2018/0073634 A1* 3/2018 Suwabe .................. F16H 61/16
(Continued)

FOREIGN PATENT DOCUMENTS

| JP | 11-013876 A | 1/1999 |
|---|---|---|
| JP | 2005-172012 A | 6/2005 |
| JP | 2009-257444 A | 11/2009 |

*Primary Examiner* — David J Hlavka
(74) *Attorney, Agent, or Firm* — Global IP Counselors, LLP (57) ABSTRACT A control device for a continuously variable transmission includes a belt type continuously variable transmission and a controller. The controller is configured to calculate an actual gear shift ratio based on rotation speed sensor values from a primary rotation speed sensor and a secondary rotation speed sensor, and to perform gear shift ratio control using feedback control to converge the actual gear shift ratio to a target gear shift ratio. The controller is further configured to stop calculation of the actual gear shift ratio when one of the rotation speed sensor values is less than a first threshold value determined based on a lower limit value of sensor detection accuracy, and stop calculation of the actual gear shift ratio even when one of the rotation speed sensor values is the first threshold value or greater, when a deceleration level of the drive wheel is a prescribed deceleration level or greater.

5 Claims, 6 Drawing Sheets (51) Int. Cl.
*F16H 59/40* (2006.01)
*F16H 59/50* (2006.01)
*F16H 59/70* (2006.01)

(52) U.S. Cl.
CPC ........ *F16H 59/70* (2013.01); *F16H 2059/506* (2013.01); *F16H 2059/704* (2013.01)

(58) Field of Classification Search
CPC ......... F16H 2059/506; F16H 2059/704; F16H 61/0204; F16H 59/46; F16H 2061/0078; F16H 59/44; F16H 2059/465
See application file for complete search history.

(56) References Cited

U.S. PATENT DOCUMENTS

2018/0106367 A1* 4/2018 Mouri .................... B60W 20/30
2019/0225222 A1* 7/2019 Nishihiro .............. B60W 10/06

* cited by examiner

CONTROL DEVICE FOR CONTINUOUSLY VARIABLE TRANSMISSION

CROSS-REFERENCE TO RELATED APPLICATIONS

This is a U.S. national phase application of PCT/JP2017/027275, filed on Jul. 27, 2017, which claims priority to Japanese Patent Application No. 2016-153062, filed on Aug. 3, 2016. The entire disclosure of Japanese Patent Application No. 2016-153062 is hereby incorporated herein by reference.

TECHNICAL FIELD

The present invention relates to a control device for a continuously variable transmission that calculates an actual gear shift ratio based on a rotation speed sensor value from a primary rotation speed sensor and a secondary rotation speed sensor.

BACKGROUND ART

In the past, there has been disclosed a control device of a belt type continuously variable transmission that adjusts the hydraulic pressure necessary for holding at a maximum gear shift ratio when the gear shift ratio is less than a reference value that is limited based on a lower limit value of a secondary rotation speed for which calculation can be done at the accuracy necessary for feedback control (see Patent Document 1, for example).

However, with the conventional device, for example, in the case of spin recovery such as moving to a gripping state by an accelerator foot release operation when a drive wheel is in a spinning state, the deceleration level of the secondary rotation speed of the secondary pulley becomes greater. In this way, when the deceleration level of the secondary rotation speed becomes greater, an actual gear shift ratio calculated based on a primary rotation speed and the secondary rotation speed jump to the high gear shift side, primary pressure drops due to gear shift FB control, and there was the problem that belt slipping sometimes occurs.

PRIOR ART DOCUMENTS

Patent Documents

[Patent Document 1] Japanese Laid-Open Patent Publication No. 2009-257444

SUMMARY OF THE INVENTION

The present invention was created with a focus on the abovementioned problem, and its purpose is to prevent belt slipping that occurs due to execution of calculation of the actual gear shift ratio during rapid deceleration for which there is a high deceleration level of the drive wheel.

Means for Solving the Problems

To achieve the abovementioned purpose, the present invention comprises a belt type continuously variable transmission, and a controller. The belt type continuously variable transmission is interposed between a drive source and a drive wheel, and has a primary pulley and a secondary pulley for which a pulley belt is stretched across.

The controller calculates an actual gear shift ratio based on a rotation speed sensor value from a primary rotation speed sensor and a secondary rotation speed sensor, and performs gear shift ratio control using feedback control that converges the actual gear shift ratio to a target gear shift ratio.

In this control device for a continuously variable transmission, while the controller stops calculation of the actual gear shift ratio when the rotation speed sensor value is less than a first threshold value determined by a lower limit value of sensor detection accuracy, when the deceleration level of the drive wheel is a designated deceleration level or greater, calculation of the actual gear shift ratio is stopped even when the rotation speed sensor value is the first threshold value or greater.

As a result, it is possible to prevent belt slipping that occurs due to execution of calculation of the actual gear shift ratio during rapid deceleration with a high deceleration level of the drive wheel.

MODES FOR CARRYING OUT THE INVENTION

Hereafter, a preferred mode of realizing a control device for a continuously variable transmission of the present invention is explained based on Embodiment 1 shown in the drawings.

Embodiment 1

First, the configuration is explained.

The control device for a continuously variable transmission of Embodiment 1 is applied to an engine mounted vehicle such as an engine vehicle, a hybrid car, etc., that uses a belt type continuously variable transmission for the transmission. Hereafter, the configuration of the control device of a belt type continuously variable transmission of Embodiment 1 is explained divided into "Overall System Configuration" and "Actual Gear Shift Ratio Calculation Process Configuration."

[Overall System Configuration]

Figure 1:
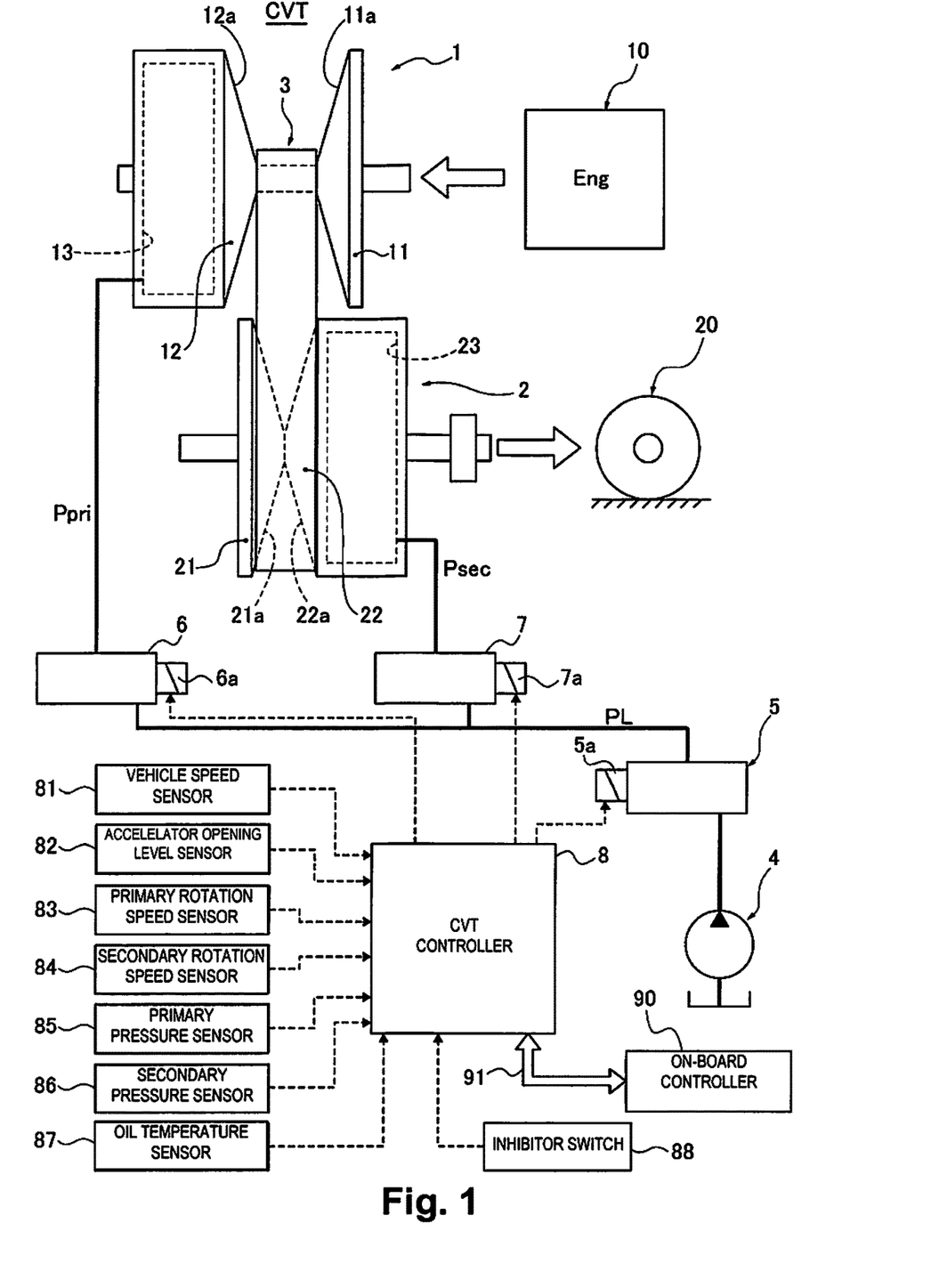
FIG. 1 is an overall system diagram showing a belt type continuously variable transmission to which a control device of Embodiment 1 is applied.

FIG. 1 shows a belt type continuously variable transmission to which the control device of Embodiment 1 is applied. Hereafter, the overall system configuration of a belt type continuously variable transmission CVT is explained based on FIG. 1.

As shown in FIG. 1, the belt type continuously variable transmission CVT comprises a primary pulley 1, a secondary pulley 2, and a pulley belt 3.

The primary pulley 1 is configured by a combination of a fixed pulley 11 having a sheave surface 11a, and a drive pulley 12 having a sheave surface 12a, and drive torque is input from an engine 10 (drive source). In the drive pulley 12, a primary pressure chamber 13 is formed that hydraulically drives the drive pulley 12 in the shaft direction with respect to the fixed pulley 11.

The secondary pulley 2 is configured by a combination of a fixed pulley 21 having a sheave surface 21a, and a drive pulley 22 having a sheave surface 22a, and drive torque is output to a drive wheel 20 via a final reduction gear, etc. In the drive pulley 22, a secondary pressure chamber 23 is formed that hydraulically drives the drive pulley 22 in the shaft direction with respect to the fixed pulley 21.

The pulley belt 3 is stretched across the sheave surfaces 11a, 12a of the primary pulley 1 and the sheave surfaces 21a, 22a of the secondary pulley 2, and shifts gears continuously by changing the facing interval of the sheave surfaces 11a, 12a and the facing interval of the sheave surfaces 21a, 22a. As this pulley belt 3, a belt with a chain structure or a belt with an element laminated structure is used. Also, when in the highest gear shift ratio, the pulley belt 3 has the contact radius with respect to the primary pulley 1 as the maximum radius, and the contact radius with respect to the secondary pulley 2 as the minimum radius. Also, when in the lowest gear shift ratio, as shown in FIG. 1, the contact radius with respect to the primary pulley 1 is the minimum radius, and the contact radius with respect to the secondary pulley 2 is the maximum radius.

As shown in FIG. 1, as a hydraulic pressure control system of the belt type continuously variable transmission CVT, comprised are an oil pump 4, a pressure regulator valve 5, a primary pressure gear shift valve 6, and a secondary pressure gear shift valve 7. Each of these hydraulic pressure control valves 5, 6, 7 has a solenoid movable part using a spool, etc., that is moved by a solenoid current applied to solenoids 5a, 6a, 7a. The hydraulic pressure control valves 5, 6, 7 are in a mode for which the output control pressure is at maximum when the command current is at minimum, and the output control pressure is at a minimum when the command current is at maximum.

The pressure regulator valve 5 adjusts line pressure PL which is the highest oil pressure as the gear shift pressure based on pump discharge pressure from the oil pump 4.

The primary pressure gear shift valve 6, with line pressure PL as the source pressure, does pressure regulation of a primary pressure Ppri guided to the primary pressure chamber 13. For example, when at the highest gear shift ratio, the primary pressure Ppri is set as the line pressure PL, and the further the move to the low gear shift ratio side, the lower the pressure of the gear shift pressure.

The secondary pressure gear shift valve 7, with the line pressure PL as the source pressure, does pressure regulation of a secondary pressure Psec guided to the secondary pressure chamber 23. For example, when at the lowest gear shift ratio, the secondary pressure Psec is set as the line pressure PL, and the further the move to the high gear shift ratio side, the lower the pressure of the gear shift pressure.

As shown in FIG. 1, as an electronic control system of the belt type continuously variable transmission CVT, comprised is a CVT controller 8 (controller) that performs gear shift ratio control, etc., of the belt type continuously variable transmission CVT. As input sensors to the CVT controller 8, comprised are a vehicle speed sensor 81, an accelerator opening level sensor 82, a primary rotation speed sensor 83, a secondary rotation speed sensor 84, a primary pressure sensor 85, a secondary pressure sensor 86, an oil temperature sensor 87, and an inhibitor switch 88, etc. Furthermore, information necessary for control such as engine rotation speed information, etc., is brought to the CVT controller 8 via a CAN communication line 91 from another on-board controller 90.

The gear shift ratio control executed by the CVT controller 8 determines the target primary rotation speed by the driving point on a gear shift schedule specified using the vehicle speed VSP and the accelerator opening level APO detected by the sensors 81, 82, and calculates the target gear shift ratio based on the target primary rotation speed. Meanwhile, the actual gear shift ratio is calculated using the primary rotation speed and the secondary rotation speed according to the rotation sensor filtered value for which filter processing was done on the rotation sensor raw value from the primary rotation speed sensor 83 and the secondary rotation speed sensor 84. Also, to have the actual gear shift ratio converge to the target gear shift ratio, this is performed by the primary command pressure and the secondary command pressure being found by the gear shift feedback control with respect to the gear shift ratio deviation, and by controlling the primary pressure Ppri and the secondary pressure Psec.

[Actual Gear Shift Ratio Calculation Process Configuration]

Figure 2:
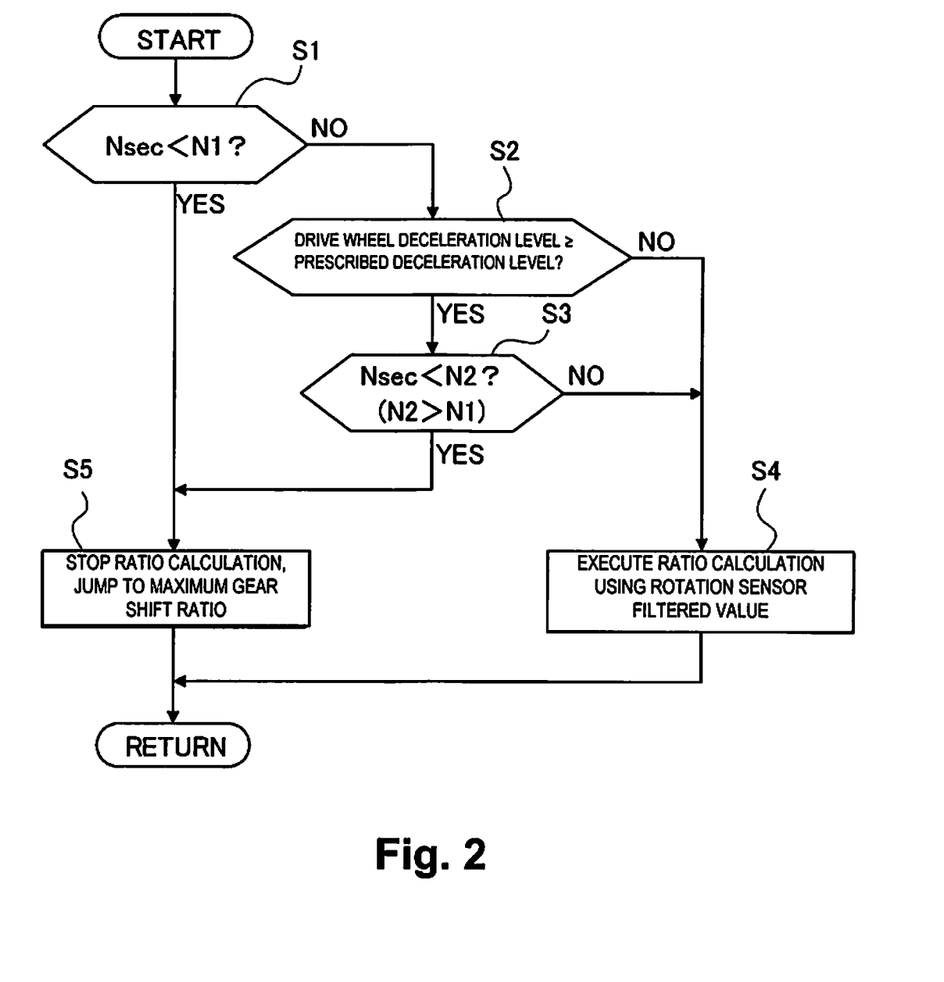
FIG. 2 is a flow chart showing the flow of an actual gear shift ratio calculation process executed by a CVT controller of Embodiment 1.

FIG. 2 is a flow chart showing the flow of the actual gear shift ratio calculation process executed by the CVT controller 8 of Embodiment 1. Hereafter, each step in FIG. 2 representing the process configuration of the actual gear shift ratio calculation (=ratio calculation) is explained. This actual gear shift ratio calculation process is executed repeatedly at designated control cycles (e.g. 10 msec).

At step S1, a judgment is made of whether or not a secondary rotation speed Nsec is less than a first threshold value N1 determined according to the lower limit value of the sensor detection accuracy. When YES (Nsec<N1), the process advances to step S5, and when NO (Nsec≥N1), the process advances to step S2.

Here, as the "secondary rotation speed Nsec," the rotation sensor filtered value after filter processing of the rotation sensor raw value from the secondary rotation speed sensor 84 using a weighted average, etc., is used. The "first threshold value N1" is set to the lower limit of the rotation speed at which sensor detection accuracy can be ensured (e.g. value of approximately 200 rpm).

At step S2, following the judgment at step S1 that Nsec≥N1, a judgment is made of whether or not the drive wheel deceleration level is a designated deceleration level or greater. When YES (drive wheel deceleration level≥designated deceleration level), the process advances to step S3, and when NO (drive wheel deceleration level<designated deceleration level), the process advances to step S4.

Here, the "drive wheel deceleration level" is a wheel speed decrease gradient of the drive wheel 20, and originally, was found from wheel speed information, but with Embodiment 1, the pulley deceleration level of the secondary pulley 2 linked to the drive wheel 20 is used. In other words, the "drive wheel deceleration level" is found using the difference (rotation speed difference per unit of time) between the rotation sensor filtered value acquired the current time from the secondary rotation speed sensor 84, and the rotation sensor filtered value acquired at one prior control cycle.

The "designated deceleration level" is set, for example, based on the deceleration level of the drive wheel 20 during spin recovery when the drive wheel 20 moves from a slipping state of wheel spinning due to road surface projections and recessions, etc., to a gripping state by an accelerator foot release operation, etc., to suppress wheel spinning.

At step S3, following the judgment at step S2 that the drive wheel deceleration level≥the designated deceleration level, a judgment is made of whether or not the secondary rotation speed Nsec is less than a second threshold value N2 (>first threshold value N1). When YES (Nsec<N2), the process advances to step S5, and when NO (Nsec≥N2), the process advances to step S4.

Here, the "second threshold value N2" is set to the rotation speed value (e.g. value of approximately 400 rpm) by which is obtained the timing to suppress moving to the high gear shift ratio side of the calculation value of the actual gear shift ratio by execution of ratio calculation at the time of spin recovery due to the drive wheel deceleration level≥the designated deceleration level.

At step S4, following the judgment at step S2 that the drive wheel decoration level<the designated deceleration level, or the judgment at step S3 that Nsec N2, the ratio calculation using the rotation sensor filtered value is executed, and the process goes to Return.

Here, the "ratio calculation using the rotation sensor filtered value" means calculation of the actual gear shift ratio using the primary rotation speed and the secondary rotation speed according to the rotation sensor filtered values for which the rotation sensor raw values from the primary rotation speed sensor 83 and the secondary rotation speed sensor 84 underwent filter processing.

At step S5, following the judgment at step S1 that Nsec<N1, or the judgment at step S3 that Nsec<N2, the ratio calculation stops, the gear shift ratio of the belt type continuously variable transmission CVT jumps to the low side maximum gear shift, and the process goes to Return.

When the gear shift ratio of the belt type continuously variable transmission CVT jumps to the low side maximum gear shift ratio, thereafter, the calculation value of the actual gear shift ratio is fixed to the low side maximum gear shift ratio until the ratio calculation starts again.

Next, the operation is explained.

The operation for the control device of a belt type continuously variable transmission of Embodiment 1 is explained divided into "Actual Gear Shift Ratio Calculation Process Operation," "Belt Slipping Occurrence Operation with a Comparison Example," "Actual Gear Shift Ratio Calculation Operation for Respective Proposal 1 to Proposal 4," and "Characteristic Operation of Actual Gear Shift Ratio Calculation."

[Actual Gear Shift Ratio Calculation Process Operation]

Hereafter, the actual gear shift ratio calculation process operation is explained based on the flow chart of FIG. 2.

When the secondary rotation speed Nsec is the first threshold value N1 or greater, and the drive wheel deceleration level is less than the designated deceleration level, in the flow chart of FIG. 2, the flow of advancing from step S1 to step S2 to step S4 to Return is repeated. At step S4, calculation of the actual gear shift ratio (ratio calculation) using the rotation sensor filtered value is executed.

In the Nsec≥N1 state, when the drive wheel deceleration level≥designated deceleration level, but the secondary rotation speed Nsec is the second threshold value N2 or greater, in the flow chart of FIG. 2, the flow advancing from step S1 to step S2 to step S3 to step S4 to Return is repeated. At step S4, calculation of the actual gear shift ratio (ratio calculation) using the rotation sensor filtered value is executed.

Meanwhile, regardless of the size of the drive wheel deceleration level, when the secondary rotation speed Nsec is less than the first threshold value N1, in the flow chart of FIG. 2, the flow advancing from step S1 to step S5 to Return is repeated. At step S5, calculation of the actual gear shift ratio (ratio calculation) is stopped, and the gear shift ratio of the belt type continuously variable transmission CVT jumps to the low side maximum gear shift ratio.

When Nsec≥N1, but the drive wheel deceleration level≥the designated deceleration level, and the secondary rotation speed Nsec is less than the second threshold value N2, in the flow chart of FIG. 2, the flow advancing from step S1 to step S2 to step S3 to step S5 to Return is repeated. At step S5, calculation of the actual gear shift ratio (ratio calculation) is stopped, and the gear shift ratio of the belt type continuously variable transmission CVT jumps to the low side maximum gear shift ratio.

In this way, the stop condition that is the basis of the ratio calculation is when the secondary rotation speed Nsec is less than the first threshold value N1. In contrast to this, this is an item for which with Embodiment 1, when the rapid deceleration condition that is the drive wheel deceleration level≥the designated deceleration level is established, a stop condition of the ratio calculation is newly added, such as that the ratio calculation is stopped when the secondary rotation speed Nsec is less than the second threshold value N2 (>N1).

[Belt Slipping Occurrence Operation with a Comparison Example]

An example for which the ratio calculation is stopped only when the secondary rotation speed Nsec is less than the first threshold value N1 is used as a comparison example. In this comparison example, the mechanism by which slipping occurs with the pulley belt 3 when the drive wheel deceleration level becomes large due to spin recovery is explained based on the time chart shown in FIG. 3.

Figure 3:
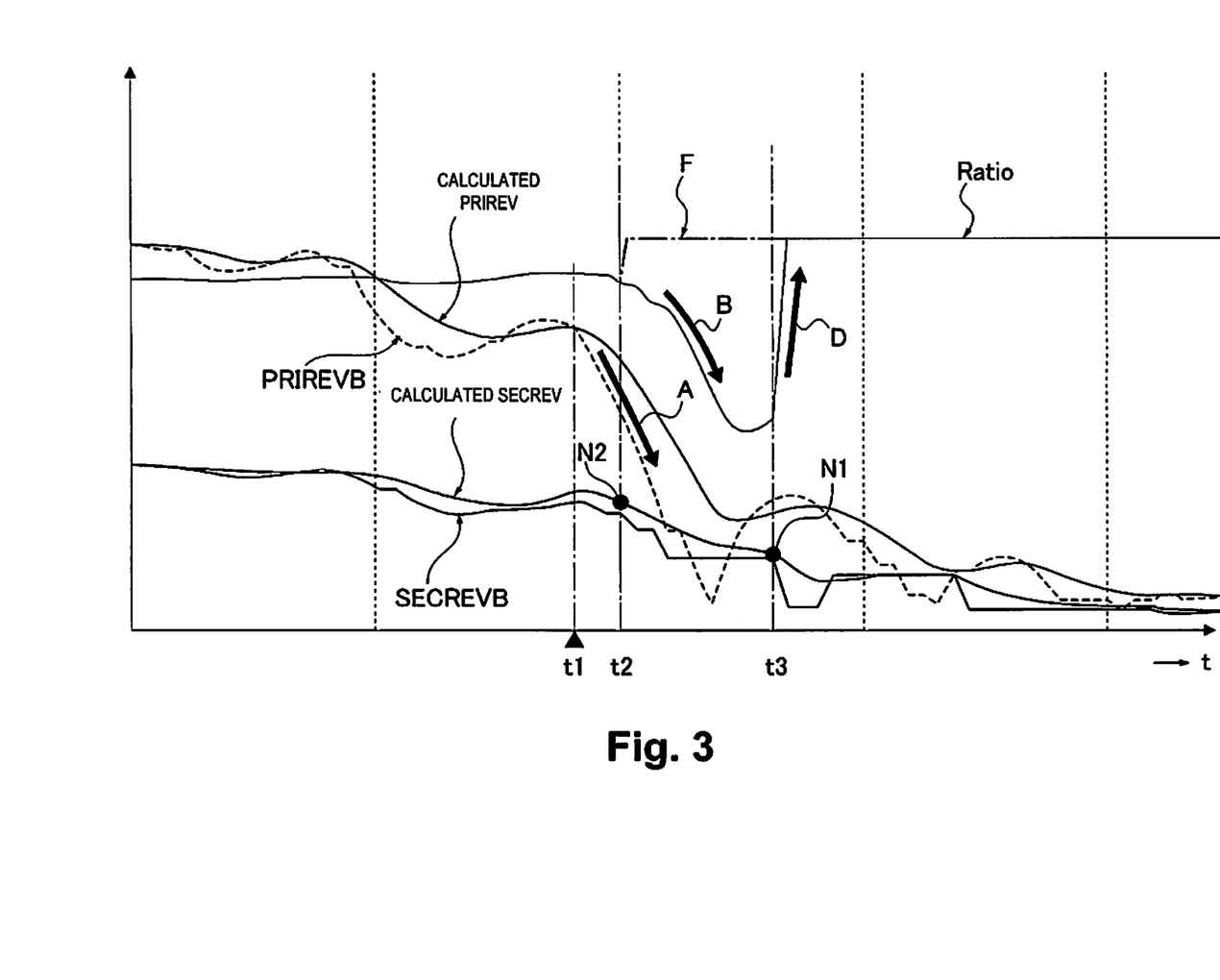
FIG. 3 is a time chart showing a mechanism by which belt slipping occurs due to calculation of the actual gear shift ratio in a spin recovery region of a drive wheel with the actual gear shift ratio calculation in a comparison example.

In FIG. 3, "calculated PRIREV" is the rotation sensor filtered value from the primary rotation speed sensor 83, and "PRIREVB" is the rotation sensor raw value from the primary rotation speed sensor 83. "Calculated SECREV" is the rotation sensor filtered value from the secondary rotation speed sensor 84, and "SECREVB" is the rotation sensor raw value from the secondary rotation speed sensor 84.

For example, by the accelerator foot release operation performed at time t1 of FIG. 3, when the drive wheel 20 moves from the slipping state to the gripping state by rapid deceleration by spin recovery, from time t1 and thereafter, as shown by arrow A in FIG. 3, the rotation sensor raw value PRIREVB of the primary rotation speed rapidly decreases. At this time, the secondary rotation speed Nsec decreases to match the deceleration level of the drive wheel 20, but when the rotation sensor raw value SECREVB of the secondary rotation speed Nsec decreases to the first threshold value N1, the accuracy reaches an unusable level, and from thereafter, the rotation sensor raw value SECREVB of the secondary rotation speed Nsec does not decrease to match the deceleration level of the drive wheel 20, but rather is fixed to the first threshold value N1. By doing this, the decrease of the calculated SECREV becomes slower, and the decrease does not reach the first threshold value N1 by time t3, so regardless of the fact that the accuracy of the rotation sensor raw value SECREVB of the secondary rotation speed Nsec is poor, the calculation of the actual gear shift ratio continues without stopping.

Thus, at time t1 and thereafter, when calculation of the actual gear shift ratio (Ratio) is performed using the rotation sensor filtered value, the primary rotation speed used for calculation decreases more relative to the secondary rotation speed Nsec, so as shown by arrow B in FIG. 3, the actual gear shift ratio (Ratio) of the calculation rapidly decreases to the high gear shift ratio side.

Therefore, with the gear shift feedback control, so that the actual gear shift ratio that became the high gear shift ratio is converged to the target gear shift ratio, a gear shift command is output to the low side that lowers the primary pressure Ppri, and the actual primary pressure rapidly decreases. For this reason, the belt clamping force for gripping the pulley belt 3 by the primary pulley 1 is insufficient, and slipping occurs with the pulley belt 3. After that, when time t3 is reached at which the secondary rotation speed Nsec according to the rotation sensor filtered value is less than the first threshold value N1, calculation of the actual gear shift ratio stops, and as shown by arrow D of FIG. 3, the actual gear shift ratio jumps to the low side maximum gear shift ratio.

In this way, in the case of the comparison example, the ratio calculation continues until time t3 at which the secondary rotation speed Nsec is less than the first threshold value N1, so when the deceleration level of the drive wheel 20 becomes larger by spin recovery, the actual gear shift ratio of the calculation is deviated greatly to the high gear shift ratio side. For this reason, with gear shift feedback control, control to lower the primary pressure Ppri using the actual gear shift ratio of the calculation is performed, and as a result, slipping of the pulley belt 3 occurs.

[Actual Gear Shift Ratio Calculation Operation for Respective Proposal 1 to Proposal 4]

As described above, the slipping of the pulley belt 3 brings on early degradation of the pulley belt 3 due to this being repeated a plurality of times, so preventing slipping of the pulley belt 3 is an important problem that should be addressed. Hereafter, the actual gear shift ratio calculation operations respectively for Proposal 1 to Proposal 4 presented as countermeasure proposals for a solution to the problem are explained based on FIG. 4 to FIG. 8.

Figure 4:
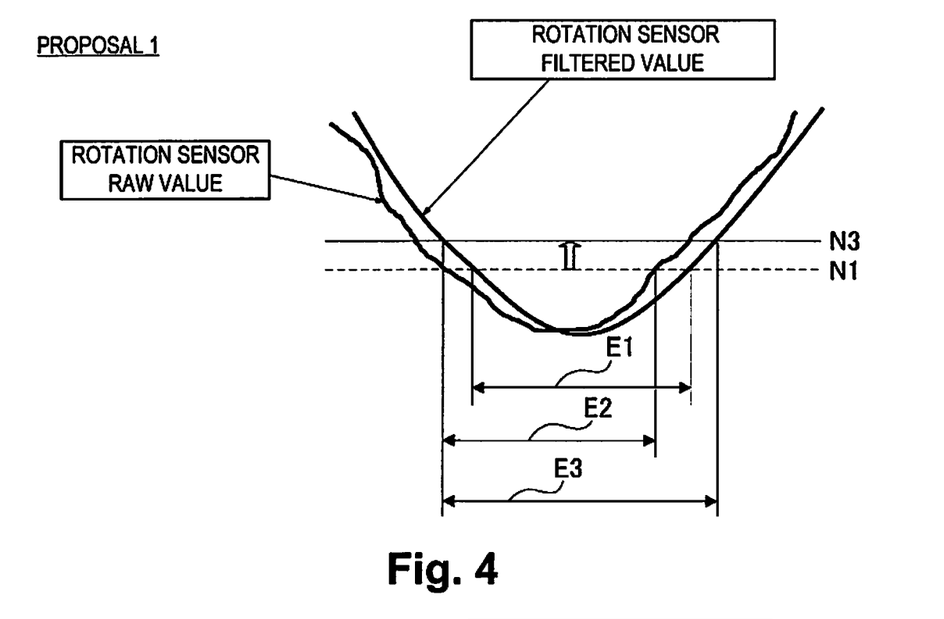
FIG. 4 is a timing chart that, in the actual gear shift ratio calculation (rotation sensor filtered value+one large threshold value) with Proposal 1, shows a range that goes to ratio MAX when the secondary pulley moves from deceleration to acceleration and a range for which the rotation sensor value cannot be used.

First, used as "Proposal 1" is an item for which at the time of the actual gear shift ratio calculation, with the rotation sensor filtered value as a determination value, one third threshold value N3 that is greater than the first threshold value N1 is used, and this is explained based on FIG. 4.

In FIG. 4, E1 shows a range made to be ratio MAX for which the rotation sensor value is not used in the comparison example, E2 shows a range for which the rotation sensor value actually cannot be used, and E3 shows a range made to be ratio MAX for which the rotation sensor value is not used in "Proposal 1."

In the case of this "Proposal 1," the relationship is E3>E2>E1, and the range to be made ratio MAX without using the rotation sensor value is expanded. For this reason, at the starting time for which start/execution of the actual gear shift ratio calculation becomes a problem, there is a big difference from the comparison example, so an investigation to review this is needed.

Figure 5:
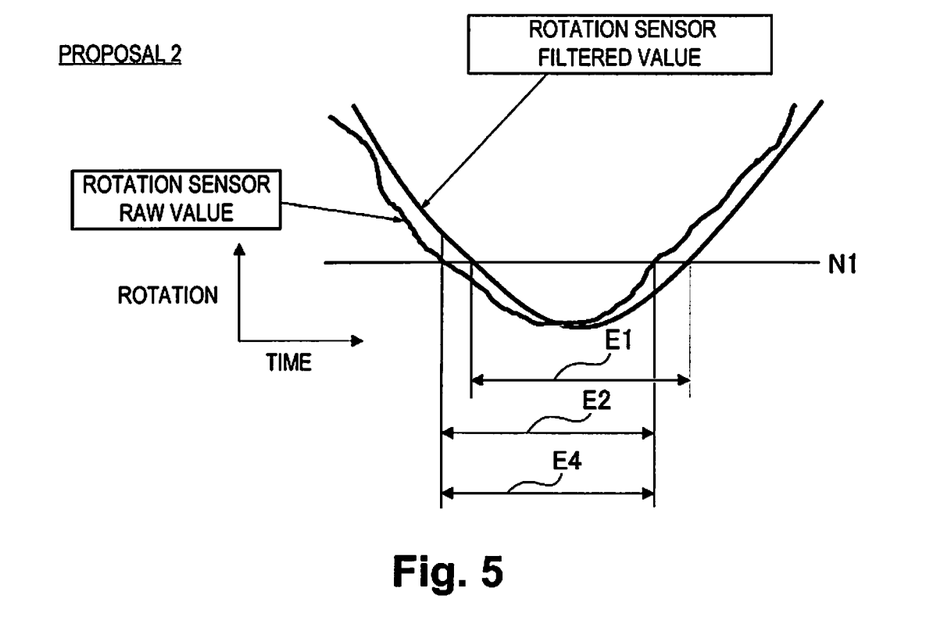
FIG. 5 is a timing chart that, in the actual gear shift ratio calculation (rotation sensor raw value+one large threshold value) with Proposal 2, shows a range that goes to ratio MAX when the secondary pulley moves from deceleration to acceleration and a range for which the rotation sensor value cannot be used.

Used as "Proposal 2" is an item for which at the time of the actual gear shift ratio calculation, instead of the rotation sensor filtered value, the rotation sensor raw value is used as a determination value, one first threshold value N is used, and this is explained based on FIG. 5.

In FIG. 5, E1 shows a range made to be ratio MAX for which the rotation sensor value is not used in the comparison example, E2 shows a range for which the rotation sensor value actually cannot be used, and E4 shows a range made to be ratio MAX for which the rotation sensor value is not used in "Proposal 2."

In the case of this "Proposal 2," since an unstable rotation sensor raw value is used as the determination value, there is a possibility of hunting of stop/execution of the actual gear shift ratio calculation occurring. The relationship is E4=E2≈E1, and the range made to be ratio MAX without using the rotation sensor value fluctuates. For this reason, at the starting time when stop/execution of the actual gear shift ratio calculation becomes a problem, this is different from the comparison example, so an investigation to review this is needed.

Figure 6:
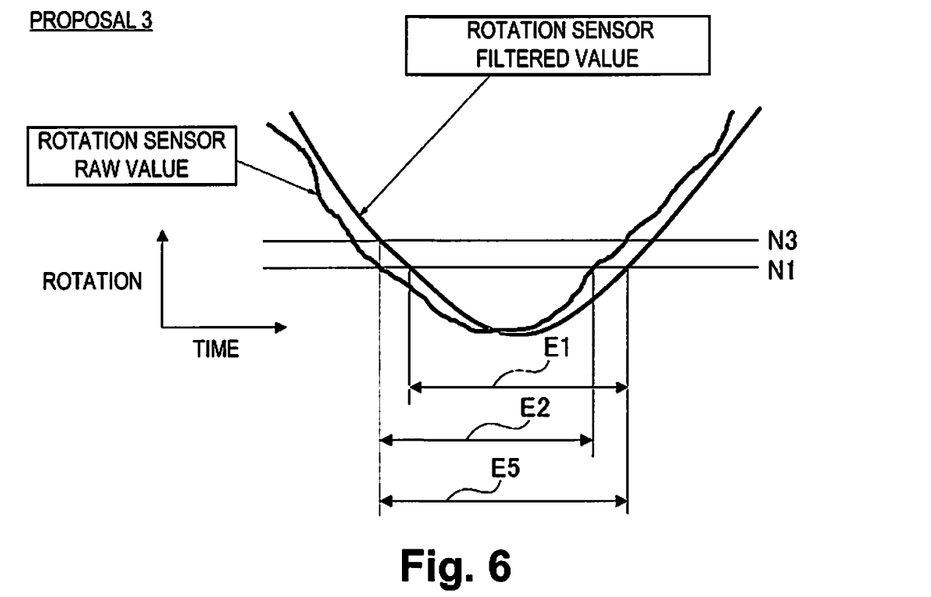
FIG. 6 is a timing chart that, in the actual gear shift ratio calculation (rotation sensor filtered value+two hysteresis threshold values) with Proposal 3, shows a range that goes to ratio MAX when the secondary pulley moves from slow deceleration to slow acceleration and a range for which the rotation sensor value cannot be used.
Figure 7:
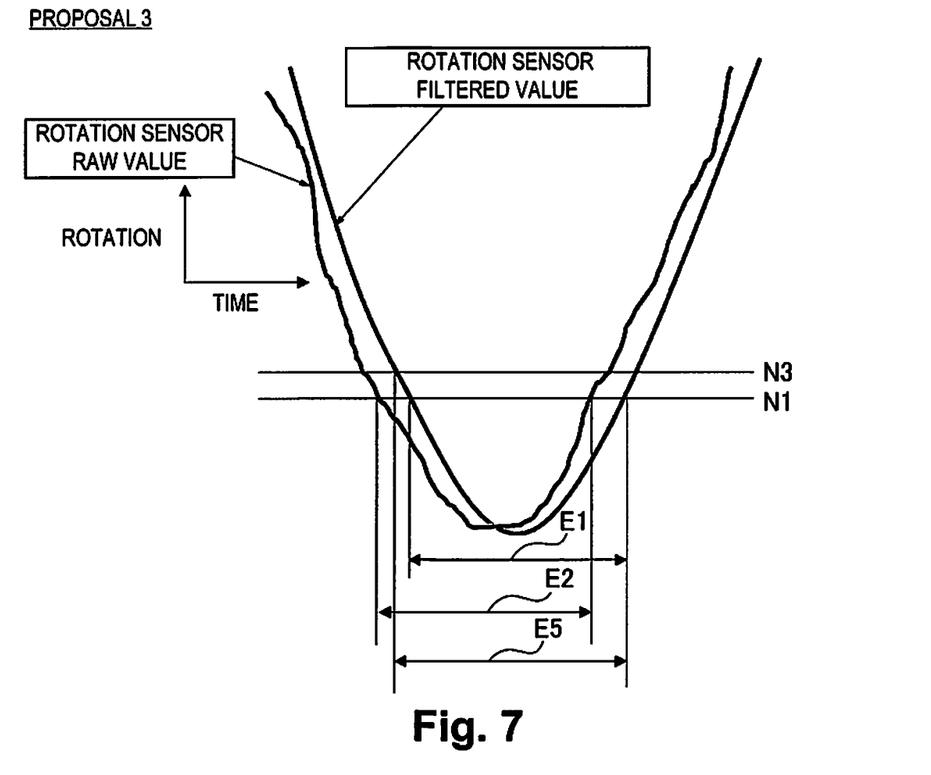
FIG. 7 is a timing chart that, in the actual gear shift ratio calculation (rotation sensor filtered value+two hysteresis threshold values) with Proposal 3, shows a range that goes to ratio MAX when the secondary pulley moves from rapid deceleration to rapid acceleration and a range for which the rotation sensor value cannot be used.

Used as "Proposal 3" is an item for which at the time of the actual gear shift ratio calculation, the rotation sensor filtered value is used as a determination value, the start threshold value for stopping calculation is a third threshold value N3 (>N1), and the cancellation threshold value for calculation stopping is the first threshold value N1, with hysteresis provided for two threshold values, and this is explained based on FIG. 6 and FIG. 7.

In FIG. 6 and FIG. 7, E1 shows a range made to be ratio MAX for which the rotation sensor value is not used in the comparison example, E2 shows a range for which the rotation sensor value actually cannot be used, and E5 shows a range made to be ratio MAX for which the rotation sensor value is not used in "Proposal 3."

In the case of this "Proposal 3," as shown in FIG. 6, at the starting time when stop/execution of the actual gear shift ratio calculation becomes a problem, it is possible to make this equivalent to the comparison example. However, as shown in FIG. 7, during rapid deceleration for which the deceleration level of the drive wheel is high, the start timing to be ratio MAX without using the rotation sensor value is delayed, and it is not possible to prevent slipping of the pulley belt 3.

Figure 8:
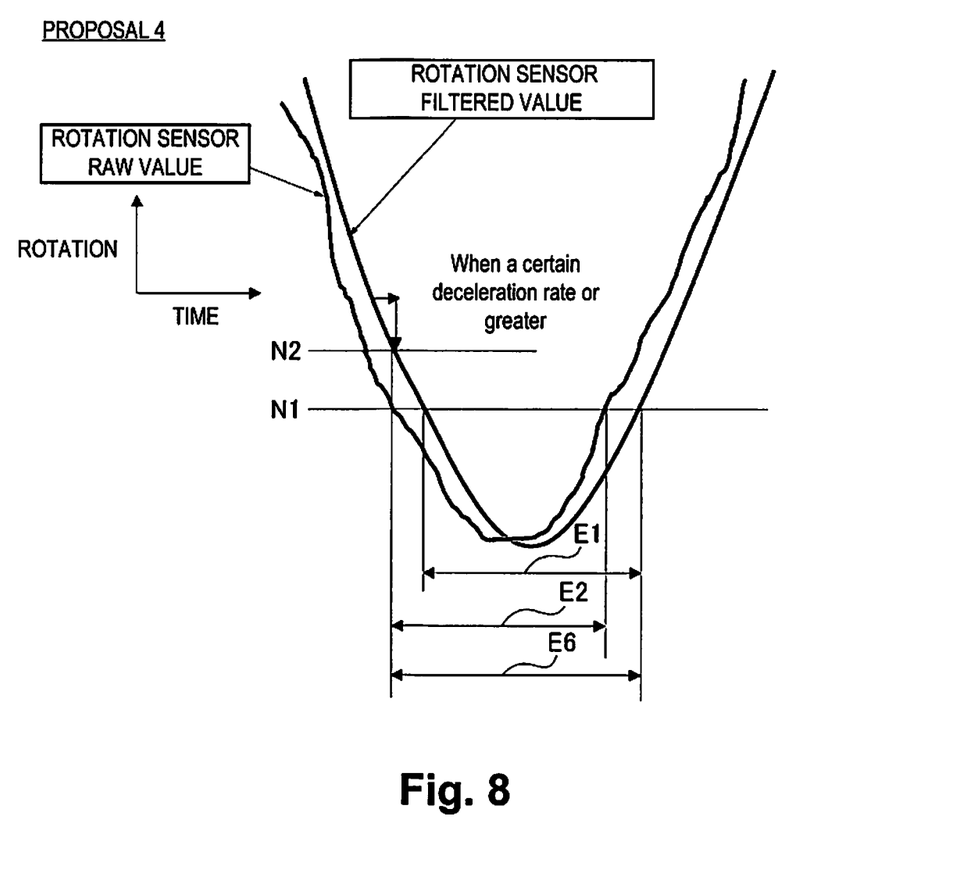
FIG. 8 is a timing chart that, in the actual gear shift ratio calculation (rotation sensor filtered value+drive wheel deceleration level+two threshold values) with Proposal 4, shows a range that goes to ratio MAX when the secondary pulley moves from rapid deceleration to rapid acceleration and a range for which the rotation sensor value cannot be used.

Used as "Proposal 4" is an item for which at the time of the actual gear shift ratio calculation, the rotation sensor filtered value is used as a determination value, the start threshold value for stopping calculation when the drive wheel deceleration level is high is a second threshold value N2 (>N1), and at other times the start threshold value is the first threshold value N1, and this is explained based on FIG. 8.

In FIG. 8, E1 shows a range made to be ratio MAX for which the rotation sensor value is not used in the comparison example, E2 shows a range for which the rotation sensor value actually cannot be used, and E6 shows a range made to be ratio MAX for which the rotation sensor value is not used when the drive wheel deceleration level is high in "Proposal 4."

In the case of this "Proposal 4," at the starting time when stop/execution of the actual gear shift ratio calculation becomes a problem, it is possible to make this equivalent to the comparison example. In addition, in the case of "Proposal 4," as shown in FIG. 8, during rapid deceleration when the drive wheel deceleration level is high, it is possible to obtain an early start timing that sets to ratio MAX without using the rotation sensor value, and it is possible to prevent slipping of the pulley belt 3.

[Characteristic Operation of Actual Gear Shift Ratio Calculation]

With Embodiment 1, in the control device of the belt type continuously variable transmission CVT, while the calculation of the actual gear shift ratio stops when the rotation speed sensor value is less than the first threshold value N1 decided according to the lower limit value of the sensor detection accuracy, the calculation of the actual gear shift ratio stops even when the rotation speed sensor value is the first threshold value N1 or greater when the deceleration level of the drive wheel 20 is the designated deceleration level or greater.

Specifically, when the deceleration level of the drive wheel 20 is the designated deceleration level or greater, when time t2 in FIG. 3 (<t3) is reached at which the secondary rotation speed Nsec decreases to less than the second threshold value N2 (>N1), the calculation of the actual gear shift ratio stops. Therefore, during rapid deceleration for which the deceleration level of the drive wheel 20 is high, belt slipping that occurs due to execution of calculation of the actual gear shift ratio is prevented. Meanwhile, when the deceleration level of the drive wheel 20 is less than the designated deceleration level, when the secondary rotation speed Nsec is less than the first threshold value N1, calculation of the actual gear shift ratio is stopped. Therefore, during starting or during slow deceleration, etc., calculation execution or calculation stopping of the actual gear shift ratio is ensured the same as in the past.

With Embodiment 1, the designated deceleration level is set based on the deceleration level of the drive wheel 20 when the drive wheel 20 is moving from the slipping state to the gripping state.

Specifically, the time when the occurrence of belt slipping caused by execution of calculation of the actual gear shift ratio becomes a problem is during spin recovery when the drive wheel 20 moves from a slipping state to a gripping state due to accelerator foot release operation, traction control, etc. Therefore, during spin recovery for which belt slipping occurrence becomes a problem, belt slipping that occurs due to execution of calculation of the actual gear shift ratio is prevented.

With Embodiment 1, the deceleration level of the drive wheel 20 is set as the pulley deceleration level of the secondary pulley 2.

Specifically, in the calculation process of the actual gear shift ratio, the secondary rotation speed sensor 84 that obtains the rotation speed information of the secondary pulley 2 linked to the drive wheel 20 is used. Therefore, the calculation process of the drive wheel deceleration level using a wheel speed sensor is not required, and the deceleration level information of the drive wheel 20 is obtained by appropriating the existing secondary rotation speed sensor 84.

With Embodiment 1, the rotation speed sensor value for determining stopping of calculation of the actual gear shift ratio is set as the rotation sensor filtered value after filter processing of the rotation sensor raw value from the secondary rotation speed sensor 84.

Specifically, with the low vehicle speed range using the low side gear shift ratio, the relationship is the primary rotation speed>the secondary rotation speed Nsec, and the secondary rotation speed Nsec first reaches the lower limit value of the detection accuracy, so the sensor output of the secondary rotation speed sensor 84 is used for determining stopping of calculation of the actual gear shift ratio. However, the fluctuation of the rotation sensor raw value from the secondary rotation speed sensor 84 is great, and there is a risk of the occurrence of hunting of calculation stop/calculation execution of the actual gear shift ratio. Therefore, by using the rotation sensor filtered value obtained from the secondary rotation speed sensor 84 for determining stopping of calculation of the actual gear shift ratio, hunting of calculation stop/calculation execution of the actual gear shift ratio is prevented.

With Embodiment 1, when calculation of the actual gear shift ratio stops, the actual gear shift ratio is set as the low side maximum gear shift ratio.

Specifically, the region for stopping calculation of the actual gear shift ratio is the region in which the secondary rotation speed Nsec is low, and the belt type continuously variable transmission CVT is the gear shift ratio of the lowest gear shift ratio region. Therefore, when calculation of the actual gear shift ratio is stopped at time t2 in FIG. 3, as shown in the Ratio characteristics by arrow F in FIG. 3, by having the actual gear shift ratio be set as the low side maximum gear shift ratio, when calculation of the actual gear shift ratio is started again, the control amount with the gear shift feedback control is kept small.

Next, the effect is explained.

With the control device of a belt type continuously variable transmission CVT of Embodiment 1, the effects listed below can be obtained.

(1) Comprised are the belt type continuously variable transmission CVT, and the controller (CVT controller 8). The belt type continuously variable transmission CVT is interposed between the drive source (engine 10) and the drive wheel 20, and has the primary pulley 1 and the secondary pulley 2 across which the pulley belt 3 is stretched.

The controller (CVT controller 8) calculates the actual gear shift ratio based on the rotation speed sensor values from the primary rotation speed sensor 83 and the secondary rotation speed sensor 84, and gear shift ratio control is performed using feedback control that converges the actual gear shift ratio to the target gear shift ratio.

In the control device of this continuously variable transmission (belt type continuously variable transmission CVT), the controller (CVT controller 8) stops calculation of the actual gear shift ratio when the rotation speed sensor value is less than the first threshold value N1 decided according to the lower limit value of the sensor detection accuracy, and on the other hand, stops calculation of the actual gear shift ratio even when the rotation speed sensor value is the first threshold value N1 or greater when the deceleration level of the drive wheel 20 is the designated deceleration level or greater.

For this reason, when there is rapid deceleration for which the deceleration level of the drive wheel 20 is high, it is possible to prevent belt slipping that occurs due to execution of calculation of the actual gear shift ratio.

(2) The controller (CVT controller 8) sets the designated deceleration level based on the deceleration level of the drive wheel 20 when the drive wheel 20 moves from the slipping state to the gripping state.

For this reason, in addition to the effect of (1), when there is spin recovery for which belt slipping occurrence becomes a problem, it is possible to prevent belt slipping that occurs due to execution of calculation of the actual gear shift ratio.

(3) The controller (CVT controller 8) has the deceleration level of the drive wheel 20 set as the pulley deceleration level of the secondary pulley 2.

For this reason, in addition to the effects of (1) or (2), the process of calculating the drive wheel deceleration level using the wheel speed sensor is not necessary, and it is possible to obtain deceleration level information of the drive wheel 20 by appropriating the existing secondary rotation speed sensor 84.

(4) The controller (CVT controller 8) has the rotation speed sensor value that determines stopping of calculation of the actual gear shift ratio set as the rotation sensor filtered value after filter processing of the rotation sensor raw value from the secondary rotation speed sensor 84.

For this reason, in addition to the effects of (1) to (3), by using the rotation sensor filtered value obtained from the secondary rotation speed sensor 84 for determining stopping of calculation of the actual gear shift ratio, it is possible to prevent hunting of calculation stopping/calculation execution of the actual gear shift ratio.

(5) The controller (CVT controller 8), when stopping calculation of the actual gear shift ratio, uses the low side maximum gear shift ratio for the actual gear shift ratio.

For this reason, in addition to the effects of (1) to (4), when stopping calculation of the actual gear shift ratio, by using the low side maximum gear shift ratio for the actual gear shift ratio, it is possible to keep the control amount with gear shift feedback control small when calculation of the actual gear shift ratio is restarted.

Above, the control device for a continuously variable transmission of the present invention was explained based on Embodiment 1, but for the specific configuration, the invention is not limited to this Embodiment 1, and as long as it does not stray from the gist of the invention in each claim of the scope of patent claims, design modifications and additions, etc., are allowed.

With Embodiment 1, shown was an example of using the pulley deceleration level of the secondary pulley 2 for the deceleration level of the drive wheel 20. However, the drive wheel deceleration level can be the wheel speed deceleration level of the drive wheel calculated based on the sensor value from the wheel speed sensor, or can also be an example that uses the transmission output shaft deceleration level based on the sensor value from the transmission output sensor.

With Embodiment 1, shown was an example of only calculation of the actual gear shift ratio being stopped when the conditions for stopping calculation of the actual gear shift ratio are established. However, it is of course also possible to have an example by which when the conditions for stopping calculation of the actual gear shift ratio are established, calculation of the actual gear shift ratio is stopped, and also, the hydraulic pressure feedback control is stopped, and calculation of the inertia phase is stopped.

With Embodiment 1, shown was an example of applying the control device for a continuously variable transmission of the present invention to an engine mounted vehicle such as an engine vehicle, hybrid car, etc. However, the control device for a continuously variable transmission of the present invention can also be applied to an electric vehicle or a fuel cell vehicle, etc., as long as it is a vehicle in which is mounted the continuously variable transmission for performing gear shift ratio control using feedback control.

The invention claimed is:

1. A control device for a continuously variable transmission comprising:
   a belt type continuously variable transmission interposed between a drive source and a drive wheel, and has a primary pulley and a secondary pulley across which a pulley belt is stretched; and
   a controller configured to calculate an actual gear shift ratio based on rotation speed sensor values from a primary rotation speed sensor and a secondary rotation speed sensor, and to perform gear shift ratio control using feedback control to converge the actual gear shift ratio to a target gear shift ratio, wherein
   the controller is further configured to
      stop calculation of the actual gear shift ratio when one of the rotation speed sensor values is less than a first threshold value determined by a lower limit value at which sensor detection accuracy is ensured,
      stop calculation of the actual gear shift ratio even when the one of the rotation speed sensor values is the first threshold value or greater, when a deceleration level of the drive wheel is a prescribed deceleration level or greater, and
      set the prescribed deceleration level based on the deceleration level of the drive wheel when the drive wheel moves from a slipping state to a gripping state.

2. The control device for the continuously variable transmission according to claim 1, wherein
   the controller is configured to set a pulley deceleration level of the secondary pulley as the deceleration level of the drive wheel.

3. The control device for the continuously variable transmission according to claim 1, wherein
   the controller is configured to set a rotation sensor filtered value after filter processing of a rotation sensor raw value from the secondary rotation speed sensor as the one of the rotation speed sensor values that determines stopping of calculation of the actual gear shift ratio.

4. The control device for the continuously variable transmission according to claim 1, wherein
   the controller is configured to set a low side maximum gear shift ratio as the actual gear shift ratio, when calculation of the actual gear shift ratio is stopped.

5. A control device for a continuously variable transmission comprising:
   a belt type continuously variable transmission interposed between a drive source and a drive wheel, and has a primary pulley and a secondary pulley across which a pulley belt is stretched; and
   controlling means for calculating an actual gear shift ratio based on rotation speed sensor values from a primary rotation speed sensor and a secondary rotation speed sensor, and for performing gear shift ratio control using feedback control to converge the actual gear shift ratio to a target gear shift ratio, wherein
   the controlling means further has functions for
      stopping calculation of the actual gear shift ratio when one of the rotation speed sensor values is less than a first threshold value determined by a lower limit value at which sensor detection accuracy is ensured, stopping calculation of the actual gear shift ratio even when the rotation speed sensor value is the first threshold value or greater, when a deceleration level of the drive wheel is a prescribed deceleration level or greater, and setting the prescribed deceleration level based on the deceleration level of the drive wheel when the drive wheel moves from a slipping state to a gripping state.

\* \* \* \* \*